United States Patent
Cabral et al.

(10) Patent No.: US 11,701,985 B1
(45) Date of Patent: Jul. 18, 2023

(54) PIVOTING CAR SEAT MOUNT

(71) Applicants: Ken Cabral, Groveland, MA (US); Jennifer Welle, Niceville, FL (US)

(72) Inventors: Ken Cabral, Groveland, MA (US); Jennifer Welle, Niceville, FL (US)

( * ) Notice: Subject to any disclaimer, the term of this patent is extended or adjusted under 35 U.S.C. 154(b) by 0 days.

(21) Appl. No.: 18/114,630

(22) Filed: Feb. 27, 2023

Related U.S. Application Data

(60) Provisional application No. 63/405,413, filed on Sep. 10, 2022.

(51) Int. Cl.
| | |
|---|---|
| *B60N 2/01* | (2006.01) |
| *B60N 2/08* | (2006.01) |
| *B60N 2/28* | (2006.01) |
| *B60N 2/14* | (2006.01) |
| *B60N 2/06* | (2006.01) |

(52) U.S. Cl.
CPC .............. *B60N 2/065* (2013.01); *B60N 2/01* (2013.01); *B60N 2/0825* (2013.01); *B60N 2/146* (2013.01); *B60N 2/2869* (2013.01)

(58) Field of Classification Search
CPC .... B60N 2/065; B60N 2/0742; B60N 2/0745; B60N 2/0825; B60N 2/01; B60N 2/14; B60N 2/146; B60N 2/26; B60N 2/28; B60N 2/2869
USPC .......................................... 296/65.06, 65.07
See application file for complete search history.

(56) References Cited

U.S. PATENT DOCUMENTS

| | | | | |
|---|---|---|---|---|
| 2,266,200 | A | 12/1941 | Hedley | |
| 2,822,858 | A * | 2/1958 | Mussler | B60N 2/14 297/344.23 |
| 4,971,392 | A * | 11/1990 | Young | B60N 2/2821 297/256.13 |
| 6,199,949 | B1 | 3/2001 | DaSilva | |
| 6,283,545 | B1 | 9/2001 | Ernst | |
| 6,572,189 | B1 | 6/2003 | Blaymore | |
| 6,938,954 | B1 * | 9/2005 | Hendren | B60N 2/2863 297/256.16 |
| 7,029,069 | B2 * | 4/2006 | Hendren | B60N 2/2869 297/256.12 |
| 7,478,877 | B2 | 1/2009 | Lhomme | |
| 7,490,897 | B2 | 2/2009 | Lhomme | |
| 7,722,118 | B2 * | 5/2010 | Bapst | A47D 9/02 297/256.16 |
| 7,731,284 | B2 * | 6/2010 | Lhomme | B60N 2/2869 297/256.16 |
| 7,891,721 | B2 | 2/2011 | Pesach | |

(Continued)

*Primary Examiner* — Gregory A Blankenship
(74) *Attorney, Agent, or Firm* — Quickpatents, LLC; Kevin Prince

(57) ABSTRACT

The present invention is a device for facilitating the loading and unloading of a child's car seat, itself installed in either a left seat or a right seat of an automobile. The device comprises a rigid stationary base configured for engaging the seat of the automobile, and a pivotable support configured for selectively receiving and securing the child's car seat thereon. A bottom side of the pivotable support is configured for pivotable sliding on a top side of the stationary base. At least one device locking mechanism is fixed with a rear side of the stationary base for securing to the seat of the automobile. A pair of pivot locking mechanisms detach a latch assembly from the stationary base when an actuator lever is actuated, allowing the pivotable support and car seat to pivot on the stationary base.

13 Claims, 5 Drawing Sheets

(56) References Cited

U.S. PATENT DOCUMENTS

| | | | |
|---|---|---|---|
| 8,696,063 B2 | 4/2014 | Rattenbury | |
| 9,487,111 B2 | 11/2016 | Lake | |
| 9,610,870 B2 | 4/2017 | Pos | |
| 9,969,305 B1* | 5/2018 | Sheriff | B60N 2/2821 |
| 10,640,020 B2 | 5/2020 | Jung | |
| 10,988,054 B1* | 4/2021 | Sturhan | B60N 2/14 |
| 11,254,244 B1* | 2/2022 | Presna | B60N 2/2866 |
| 2002/0163232 A1 | 11/2002 | Vezinet | |
| 2004/0178669 A1 | 9/2004 | Lady | |
| 2005/0077765 A1 | 4/2005 | Biaud | |
| 2008/0018141 A1* | 1/2008 | Hamazaki | B60N 2/146 |
| | | | 297/1 |
| 2008/0224516 A1* | 9/2008 | Vegt | B60N 2/2887 |
| | | | 297/256.16 |
| 2008/0252122 A1* | 10/2008 | Vallentin | B60N 2/2869 |
| | | | 297/256.12 |
| 2009/0051188 A1* | 2/2009 | Foussianes | B60N 2/2893 |
| | | | 296/68.1 |
| 2010/0032997 A1* | 2/2010 | Gold | B60N 2/2893 |
| | | | 248/542 |
| 2014/0084650 A1* | 3/2014 | Rabeony | B60N 2/2863 |
| | | | 297/256.12 |
| 2015/0336481 A1* | 11/2015 | Horsfall | B60N 2/2863 |
| | | | 297/256.16 |
| 2018/0264977 A1* | 9/2018 | Anderson | B60N 2/2863 |
| 2020/0215941 A1 | 7/2020 | Resch | |
| 2020/0269732 A1* | 8/2020 | Bendjellal | B60N 2/2869 |
| 2021/0078463 A1 | 3/2021 | Mo | |
| 2021/0086676 A1* | 3/2021 | Zhang | B60N 2/2821 |
| 2021/0197695 A1* | 7/2021 | Li | B60N 2/2872 |
| 2021/0237626 A1 | 8/2021 | Longenecker | |
| 2022/0080864 A1* | 3/2022 | Liu | B60N 2/2869 |
| 2022/0340054 A1* | 10/2022 | Riad | B60N 2/10 |
| 2022/0402413 A1* | 12/2022 | Dingman | B60N 2/2821 |
| 2023/0014310 A1* | 1/2023 | Longenecker | B60N 2/2806 |
| 2023/0040817 A1* | 2/2023 | Li | B60N 2/2875 |
| 2023/0043067 A1* | 2/2023 | Mchugh | B60N 2/2857 |
| 2023/0045293 A1* | 2/2023 | Mchugh | B60N 2/14 |
| 2023/0045540 A1* | 2/2023 | Mchugh | B60N 2/2821 |

* cited by examiner

PIVOTING CAR SEAT MOUNT

CROSS-REFERENCE TO RELATED APPLICATIONS

This application claims the benefit of U.S. Provisional Patent Application 63/405,413, filed on Sep. 10, 2022, and is incorporated herein by reference.

STATEMENT REGARDING FEDERALLY SPONSORED RESEARCH AND DEVELOPMENT

Not Applicable.

FIELD OF THE INVENTION

This invention relates to child car seats, and more particularly to a mounting platform for a child's car seat that pivots and facilitates loading and unloading of a child into the car seat.

BACKGROUND

Currently there are no comfortable solutions for loading and unloading a baby into and out of a car seat mounted within a vehicle, or similarly loading and unloading a baby in a car seat carrier into a cooperative base mounted within the vehicle. Typical configurations of automotive back seats require a person to lean forward while holding his baby outstretched, putting a significant load on his lower back. Due to the confined nature of typical vehicle rear seats, access to an installed car seat can be difficult. One solution requires the adult to awkwardly bend into the vehicle while snapping or unsnapping the rear facing seat into and out of the secured car seat base. Still another solution requires the adult to maneuver halfway into the back seat, with one foot inside and one foot outside the vehicle. This requires a person to contort his body at odd angles while holding the baby and/or car carrier away from his body. Another solution requires the adult to bend and lift simultaneously which can cause injury. All of these solutions fail to meet market needs because they are difficult, physically challenging, and can lead to injury while the weight of the baby is cantilevered away from the person's body.

Weight alone does not determine the risk for back injury while lifting an object. Other factors include:
  Whether the object is held away from the body while lifting;
  Frequency of lifting;
  Whether bending or twisting occurs while lifting;
  How high an object is to be lifted;
  Where the origin of the lift occurs; specifically, whether it is below knee height;
  Length of time the object is lifter and/or held;
  Whether if lifting a moving object, such as a fidgety baby, the adult may be required to maneuver their body quickly and unexpectedly to rebalance their center of gravity while managing the baby's unpredictable movements;
  Whether more than one object is being lifted at the same time; and
  Whether extra weight, such as a purse or diaper bag, is placed on the back or shoulder area while lifting.

Therefore, there is a need for a device that moves and pivots the child's car seat towards the person standing just outside of the vehicle. Such a needed invention would allow for placement of the device in either the left or right rear seat of the vehicle and would perform similarly from either direction. The needed device would accept a variety of car seat designs, pivot the child's car seat towards the person to facilitate the loading and unloading of the child from the car seat, and would itself be firmly and securely mounted to the rear seat of the vehicle. The present invention accomplishes these objectives.

SUMMARY OF THE INVENTION

The present device is a device for facilitating the loading and unloading of a child's car seat in a seat of an automobile. The seat may be a left seat or a right seat, for example.

The device comprises a rigid stationary base that has a substantially flat top side, a bottom side, a front side, a rear side, a left side, and a right side. The bottom side is configured for engaging the seat of the automobile.

A pivotable support has a substantially flat bottom side, a top side configured for selectively receiving and securing the child's car seat thereon, a front side, a rear side, a left side, and a right side. The bottom side is configured for pivotable sliding on the top side of the stationary base. In some embodiments, the top side of the pivotable support is substantially flat and includes a plurality of anchor points configured for anchoring the child's car seat thereto when engaged therewith.

At least one device locking mechanism is fixed with the rear side of the stationary base and adapted to selectively secure the stationary base to the seat of the automobile. The at least one device locking mechanism is preferably configured to secure to an ISOFIX anchor point or to a UAS Compatible LATCH-type anchor point of the automobile.

A first pivot locking mechanism includes a first actuator lever on the left side of the pivotable support, and a first transmission rod fixed at a proximal end thereof with the first actuator lever. The first transmission rod is fixed at a distal end thereof to a first latch assembly proximate the right side and the rear side of the pivotable support. The first latch assembly is configured to detach from the stationary base when the first actuator lever is actuated. When the first actuator is not actuated, the first latch assembly provides a pivot point around which the pivotable support pivots with respect to the stationary base.

Similarly, a second pivot locking mechanism includes a second actuator lever on the right side of the pivotable support, and a second transmission rod fixed at a proximal end thereof with the second actuator lever. The second transmission rod is fixed at a distal end thereof to a second latch assembly proximate the left side and the rear side of the pivotable support. The second latch assembly is configured to detach from the stationary base when the second actuator lever is actuated. When the second actuator is not actuated, the second latch assembly provides a pivot point around which the pivotable support pivots with respect to the stationary base.

As such, in use, with the child's car seat secured to the top side of the pivotable support, and with the device locking mechanism securing the device to the left car seat of the automobile, and with the first and second pivot locking mechanisms, engaged such that the pivotable support is aligned with and locked with the stationary base in a locked position, the first actuator lever may be actuated to unlock the first latch assembly to allow the pivotable support to be pivoted around the second latch assembly in a counterclockwise direction, the child's car seat pivoted up to 90-degrees with respect to the stationary base in a counterclockwise pivoted position, thereby facilitating loading and unloading of the child's car seat. Similarly, with the device locking mechanism securing the device to the right seat of the automobile, the second actuator lever may be actuated to unlock the second latch assembly to allow the pivotable support to be pivoted around the first latch assembly in a clockwise direction, the child's car seat pivoted 90-degrees with respect to the stationary base in a clockwise pivoted position.

The present invention is a device that moves a child's car seat or car seat carrier base towards the person standing just outside of the vehicle, allows for placement of the device in either the left or right rear seat of the vehicle, and performs similarly from either direction. The present invention can accept a variety of different car seat designs, pivot the child's car seat towards the person to facilitate the loading and unloading of the child from the car seat, and can itself be firmly and securely mounted to the rear seat of the vehicle. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
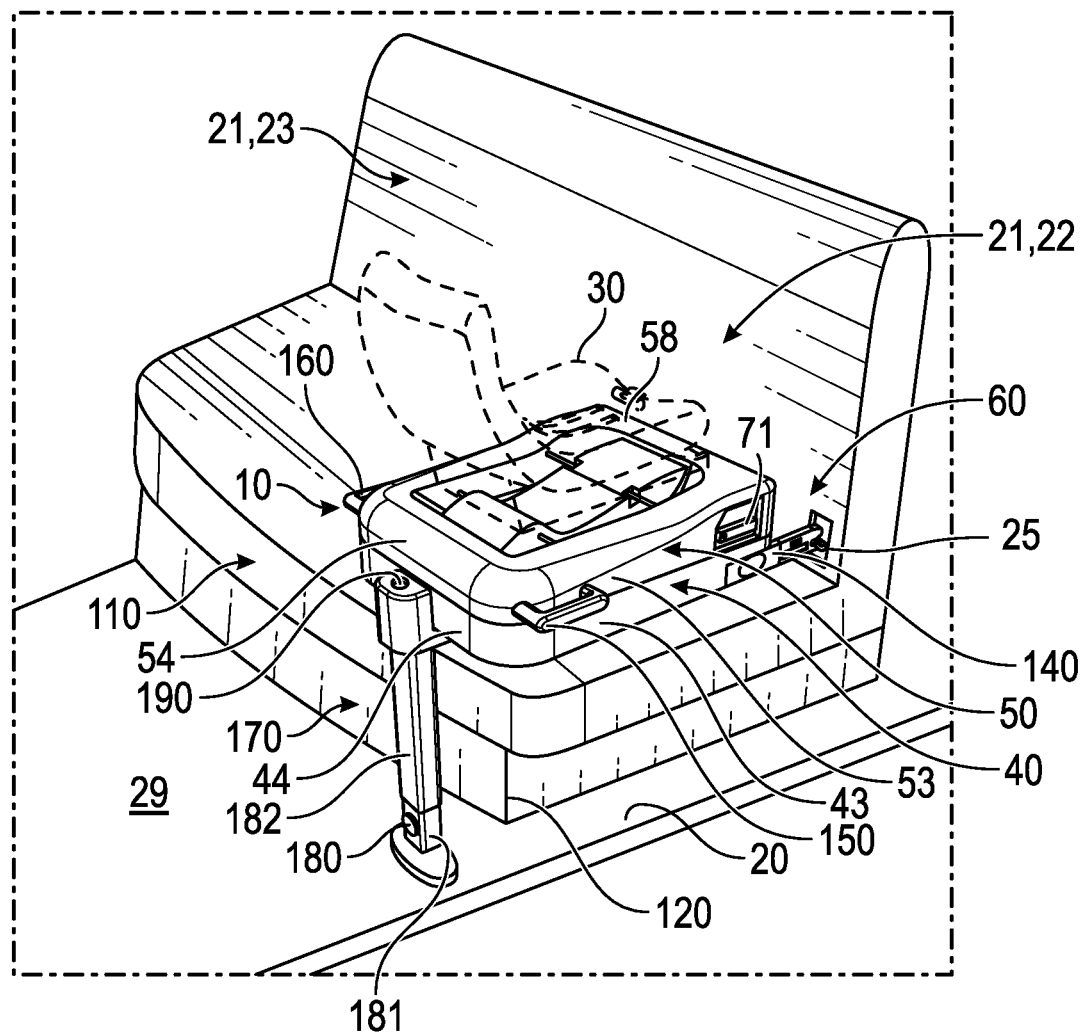
FIG. 1 is a perspective view of the invention, illustrated with a pivotable support in a locked position with respect to a stationary base of the invention.
Figure 2:
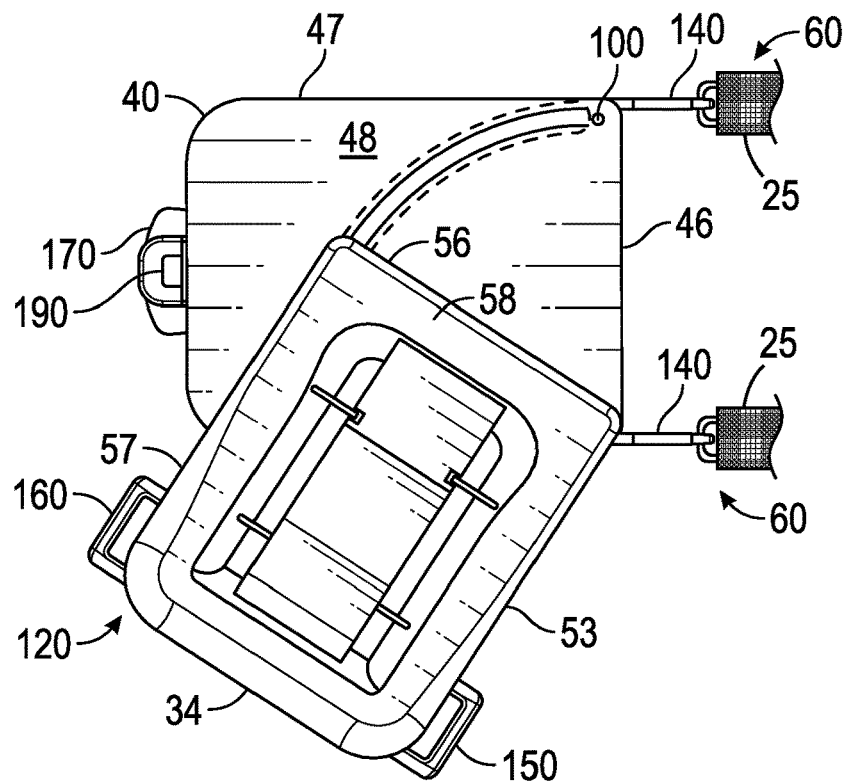
FIG. 2 is a top plan view of the invention, illustrated with the pivotable support in a counterclockwise pivoted position with respect to the stationary base.
Figure 3:
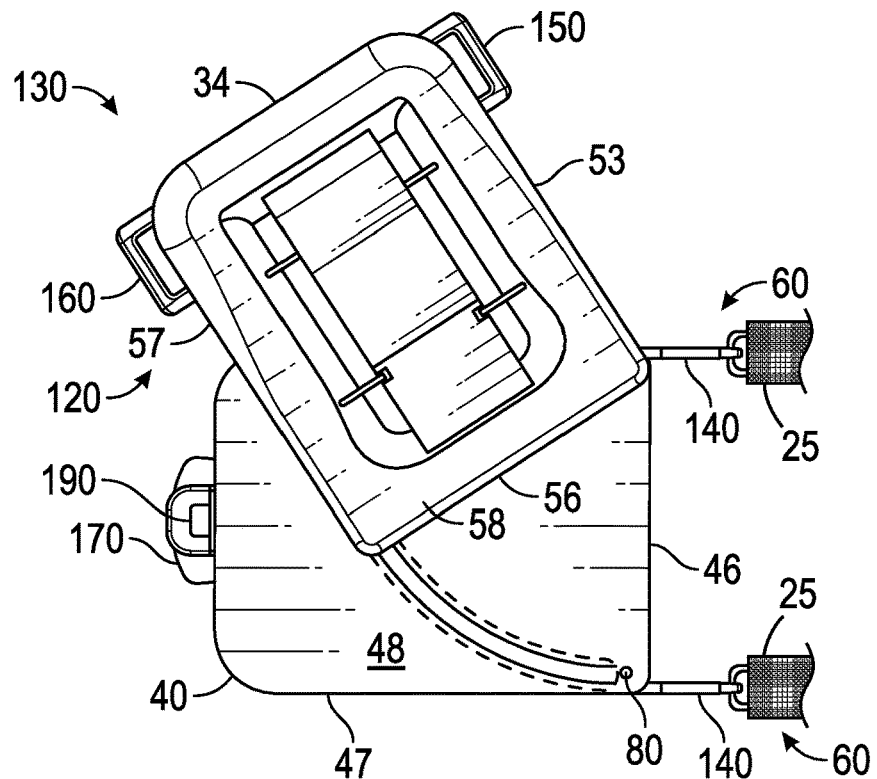
FIG. 3 is a top plan view of the invention, illustrated with the pivotable support in a clockwise pivoted position with respect to the stationary base.

FIGS. 1-3 illustrate a device 10 for facilitating the loading and unloading of a child's car seat 30 in a seat 21 of an automobile 20. The seat 21 may be a left seat 22 or a right seat 23, for example.

The device 10 comprises a rigid stationary base 40 that has a substantially flat top side 48, a bottom side 42, a front side 44, a rear side 46, a left side 43, and a right side 47. The bottom side 42 is configured for engaging the seat 21 of the automobile 20. Such a rigid stationary base 40 may be made from a rigid plastic, metal or wood material, for example.

Figure 4:
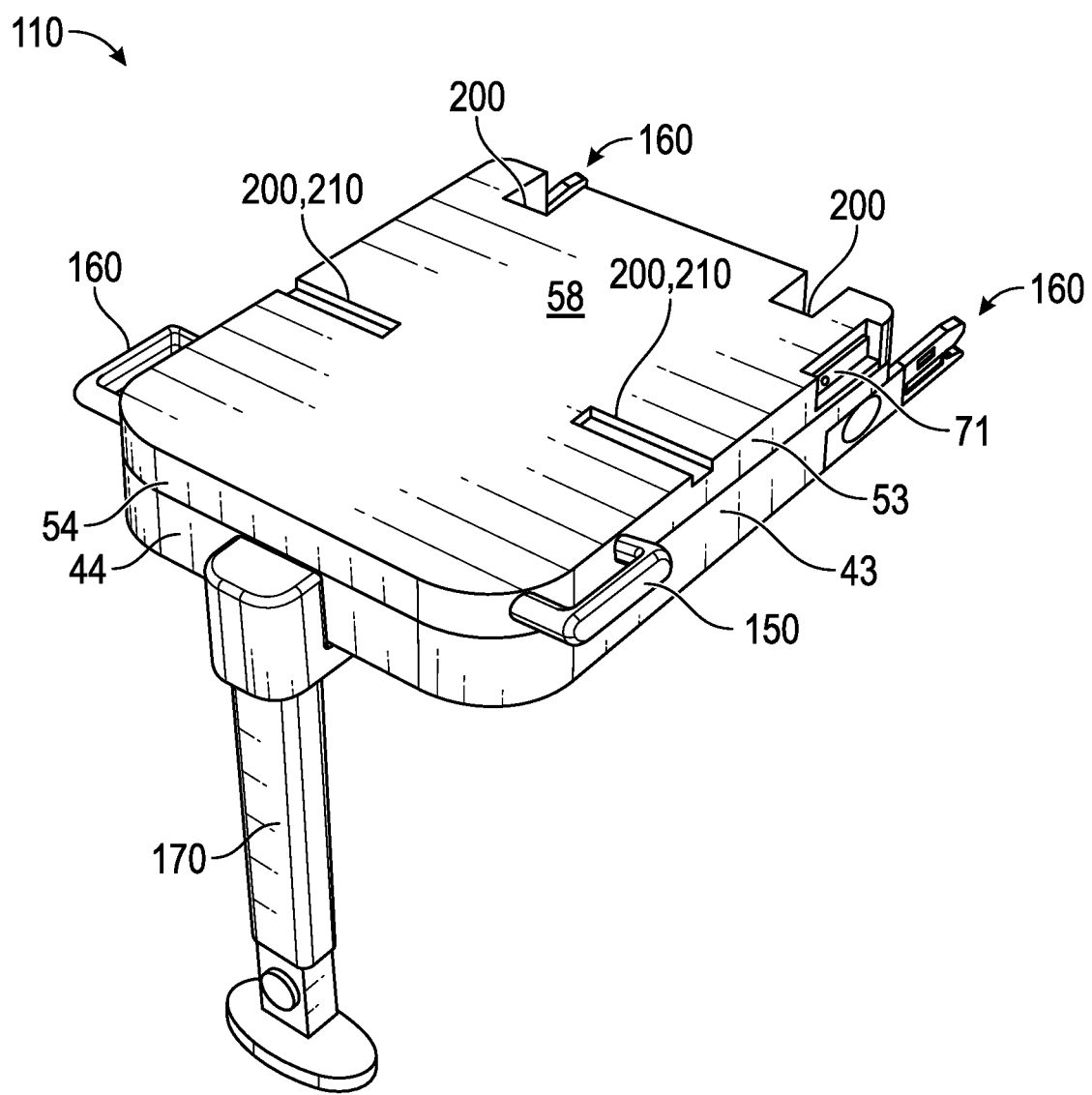
FIG. 4 is a perspective view of an alternate pivotable support of the invention.

A pivotable support 50 has a substantially flat bottom side 52, a top side 58 configured for selectively receiving and securing the child's car seat 30 thereon, a front side 54, a rear side 56, a left side 53, and a right side 57. The bottom side 52 is configured for pivotable sliding on the top side 48 of the stationary base 40. In some embodiments, the top side 58 of the pivotable support 50 is substantially flat (FIG. 4) and includes a plurality of locking bars 200 and/or anchor points 210 configured for anchoring the child's car seat 30 thereto when engaged therewith. Such a rigid pivotable support 50 may be made from a rigid plastic, metal or wood material, for example.

At least one device locking mechanism 60 is fixed with the rear side 46 of the stationary base 40 and adapted to selectively secure the stationary base 40 to the seat 21 of the automobile 20. The at least one device locking mechanism 60 is preferably configured to secure to an ISOFIX anchor point 25 of the automobile, and preferably includes an adjustable telescoping mechanism 140 for telescopingly reaching the ISOFIX anchor point 25 which can be recessed within the automobile seat 21 of some automobiles 20. Alternately, or additionally, the at least one device locking mechanism 60 is preferably configured to secure to a UAS Compatible LATCH-type anchor system of the automobile, and preferably also includes the adjustable telescoping mechanism 140. Such an adjustable telescoping mechanism 140 may include a plurality of members (not shown) telescopingly mutually disposed as is known in the art.

Figure 7:
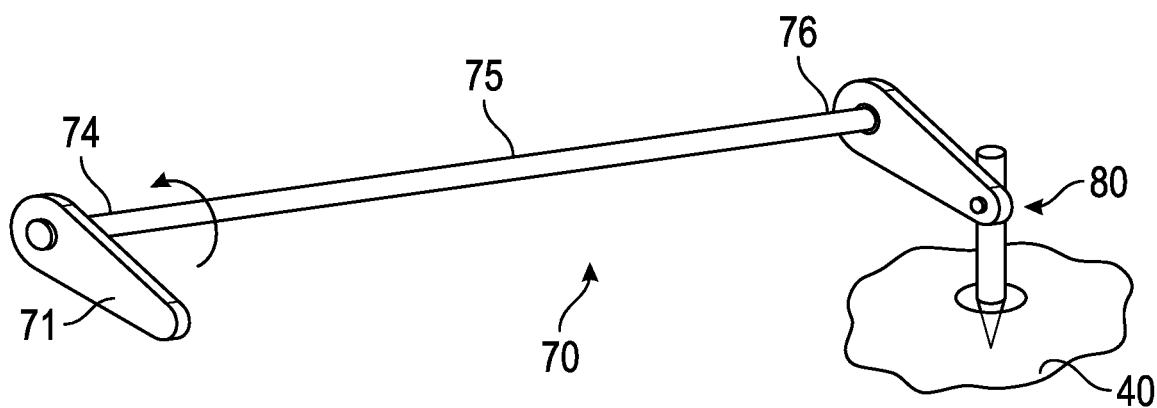
FIG. 7 is a perspective view of a first transmission rod disposed within the pivotable support, the pivotable support omitted for clarity of illustration.

A first pivot locking mechanism 70 includes a first actuator lever 71 on the left side 53 of the pivotable support 50, and a first transmission rod 75 (FIG. 7) fixed at a proximal end 74 thereof with the first actuator lever 71. The first transmission rod 75 is fixed at a distal end 76 thereof to a first latch assembly 80 proximate the right side 57 and the rear side 56 of the pivotable support 50. The first latch assembly 80 is configured to detach from the stationary base 40 when the first actuator lever 71 is actuated. When the first actuator 71 is not actuated, the first latch assembly 80 provides a pivot point around which the pivotable support 50 pivots with respect to the stationary base 40.

Figure 8:
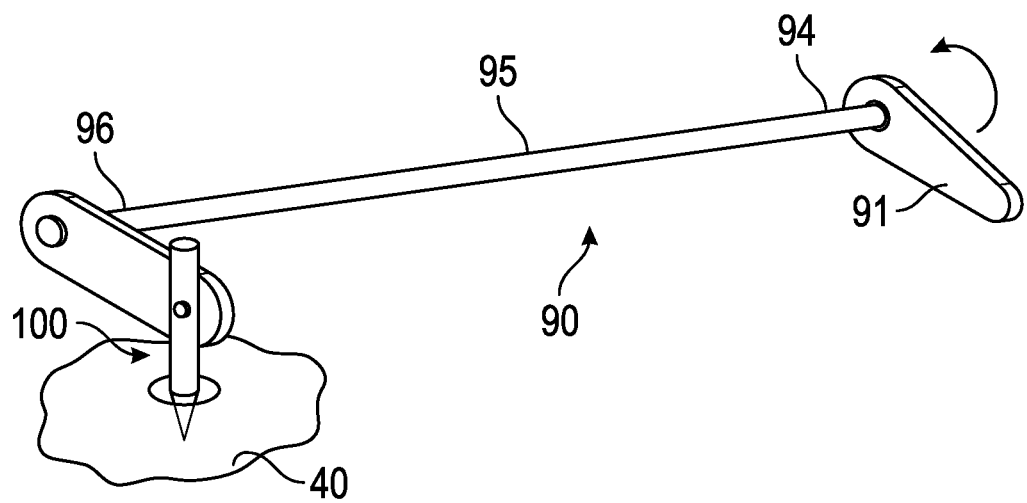
FIG. 8 is a perspective view of a second transmission rod disposed within the pivotable support, the pivotable support omitted for clarity of illustration.

Similarly, a second pivot locking mechanism 90 includes a second actuator lever 91 on the right side 57 of the pivotable support 50, and a second transmission rod 95 (FIG. 8) fixed at a proximal end 94 thereof with the second actuator lever 91. The second transmission rod 95 is fixed at a distal end 96 thereof to a second latch assembly 100 proximate the left side 53 and the rear side 56 of the pivotable support 50. The second latch assembly 100 is configured to detach from the stationary base 40 when the second actuator lever 91 is actuated. When the second actuator 91 is not actuated, the second latch assembly 100 provides a pivot point around which the pivotable support 50 pivots with respect to the stationary base 40.

As such, in use, with the child's car seat 30 secured to the top side 58 of the pivotable support 50, and with the device locking mechanism 60 securing the device 10 to the left car seat 22 of the automobile 20, and with the first and second pivot locking mechanisms 80,100 engaged such that the pivotable support 50 is aligned with and locked with the stationary base 40 in a locked position 110, the first actuator lever 71 may be actuated to unlock the first latch assembly 80 to allow the pivotable support 50 to be pivoted around the second latch assembly 100 in a counterclockwise direction, the child's car seat 30 pivoted up to 90-degrees with respect to the stationary base 40 in a counterclockwise pivoted position 120 (FIG. 2), thereby facilitating loading and unloading of the child's car seat 30. Similarly, with the device locking mechanism 60 securing the device 10 to the right seat 23 of the automobile 20, the second actuator lever 91 may be actuated to unlock the second latch assembly 100 to allow the pivotable support 50 to be pivoted around the first latch assembly 80 in a clockwise direction, the child's car seat pivoted 90-degrees with respect to the stationary base in a clockwise pivoted position 130 (FIG. 3).

Preferably the pivotable support 50 includes a first handle 150 projecting away from the left side 53 of the pivotable support 50 proximate the front side 54 of the pivotable support 50. Similarly, a second handle 160 may be included that projects away from the right side 57 of the pivotable support 50 proximate the front side 54 of the pivotable support 50.

In some embodiments, the stationary base 40 includes a stabilizing anti-rebound bar 170 projecting downwardly from proximate the front side 44 of the stationary base 40. The stabilizing anti-rebound bar 170 is adjustable in height and configured to engage a floor 29 of the automobile to stabilize the stationary base 40. Such a stabilizing anti-rebound bar 170 preferably includes a height adjustment mechanism 180 having at least a pair of telescoping members 181, 182 that are selectively mutually lockable. Such a stabilizing anti-rebound bar 170 is also preferably selectively attachable to the stationary base 40 with a stabilizing anti-rebound bar attachment mechanism 190, such as a mechanical snap mechanism, a slot-in groove mechanism, or the like, as is known in the art.

Figure 5:
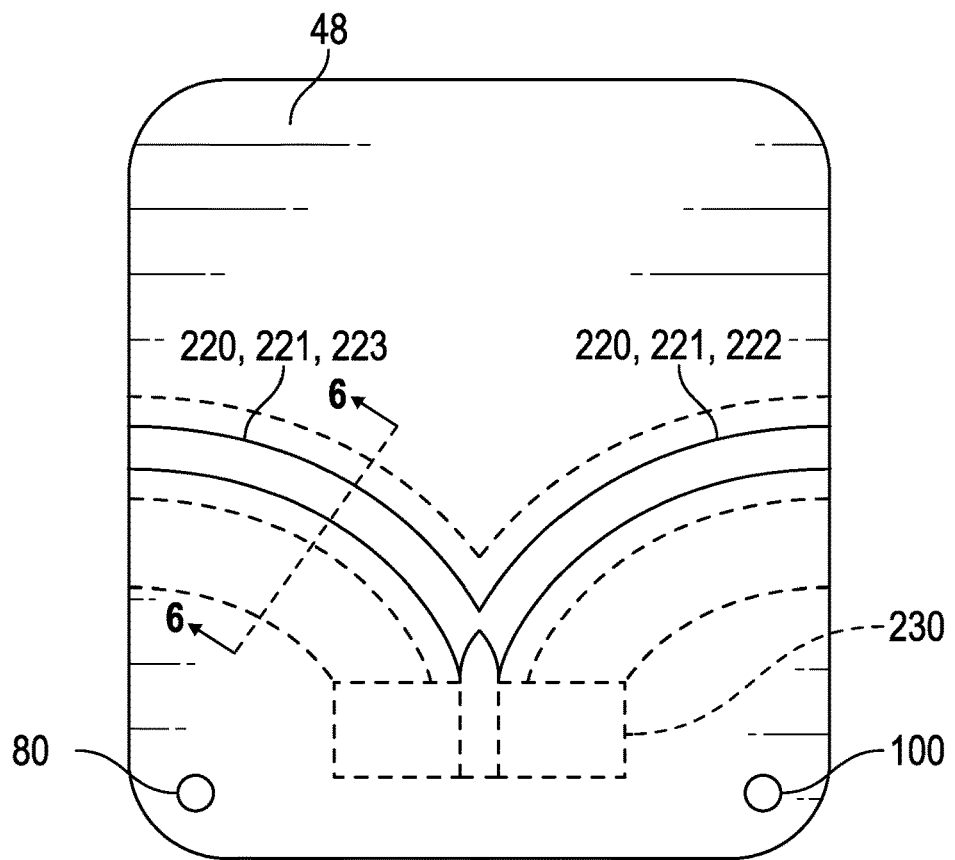
FIG. 5 is a top plan diagram of an arched and inverted T-shaped groove formed in the stationary base.
Figure 6:
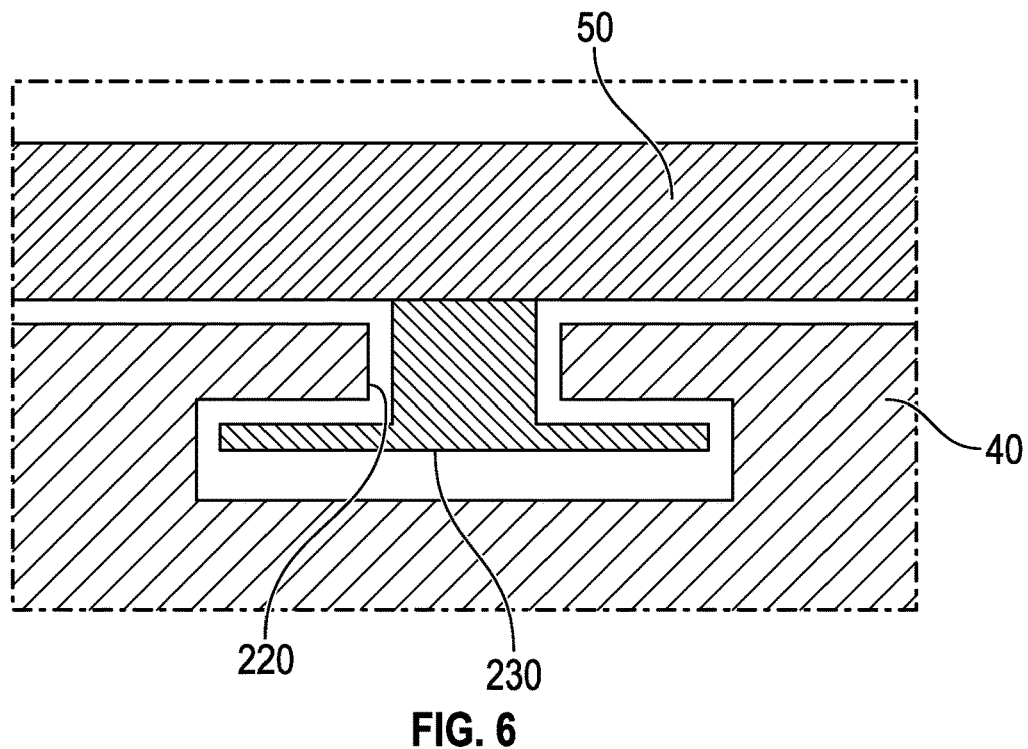
FIG. 6 is a cross-sectional view of the inverted T-shaped groove, taken along line 6-6 of FIG. 5.

Preferably the flat top side 48 of the stationary base 40 includes an arched and inverted T-shaped groove 220 (FIGS. 5 and 6), and the bottom side 52 of the pivotable support 560 includes a downwardly-projecting T-shaped tab configured for engagement with the inverted T-shaped groove 220. As such, as the pivotable support 50 pivots about either the first latch assembly 80 or the second latch assembly 100. The T-shaped tab 230 slides along the inverted T-shaped groove 220 and retains the pivotable support 50 onto the stationary base 40.

In such embodiments the arched and inverted T-shaped groove 220 may include a double-arched inverted T-shaped groove 221, comprising a right-most arched groove 222 terminating at the right side 47 of the stationary base 40 and configured to accept the projecting T-shaped tab 230 when the pivotable support 50 pivots about the second latch assembly 100, and comprising a left-most arched groove 223 terminating at the left side 43 of the stationary base 40 and configured to accept the projecting T-shaped tab 230 when the pivotable support 50 pivots about the first latch assembly 80.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device for facilitating the loading and unloading of a child into a child's car seat in a seat of an automobile, the device comprising:
    a stationary base having a substantially flat top side, a bottom side, a front side, a rear side, a left side, and a right side, the bottom side configured for engaging the seat of the automobile;

a pivotable support having a substantially flat bottom side, a top side configured for selectively receiving and securing the child's car seat thereon, a front side, a rear side, a left side, and a right side, the bottom side configured for pivotable sliding on the top side of the stationary base;

at least one device locking mechanism fixed with the rear side of the stationary base and adapted to selectively secure the stationary base to the seat of the automobile;

a first pivot locking mechanism including a first actuator lever on the left side of the pivotable support, a first transmission rod fixed at a proximal end thereof with the first actuator lever, the first transmission rod fixed at a distal end thereof to a first latch assembly proximate the right side and the rear side of the pivotable support, the first latch assembly configured to detach from the stationary base when the first actuator lever is actuated;

a second pivot locking mechanism including a second actuator lever on the right side of the pivotable support, a second transmission rod fixed at a proximal end thereof with the second actuator lever, the second transmission rod fixed at a distal end thereof to a second latch assembly proximate the left side and rear side of the pivotable support, the second latch configured to detach from the stationary base when the second actuator lever is actuated;

whereby with the child's car seat secured to the top side of the pivotable support, and with the device locking mechanism securing the device to a left seat of the automobile, and with the first and second pivot locking mechanisms engaged such that the pivotable support is aligned with and locked with the stationary base in a locked position, the first actuator lever may be actuated to unlock the first latch assembly to allow the pivotable support to be pivoted around the second latch assembly in a counterclockwise direction, the child's car seat pivoted up to 90-degrees with respect to the stationary base in a counterclockwise pivoted position to facilitate loading and unloading of the child's car seat, and whereby with the device locking mechanism securing the device to a right seat of the automobile, the second actuator lever may be actuated to unlock the second latch assembly to allow the pivotable support to be pivoted around the first latch assembly in a clockwise direction, the child's car seat pivoted 90-degrees with respect to the stationary base in a clockwise pivoted position to facilitate loading and unloading of the child.

2. The device of claim 1 wherein the at least one device locking mechanism is configured to secure to an ISOFIX anchor point of the automobile.

3. The device of claim 2 wherein the at least one first locking mechanism includes an adjustable telescoping mechanism.

4. The device of claim 1 wherein the at least one first locking mechanism is configured to secure to a UAS Compatible LATCH-type anchor system of the automobile.

5. The device of claim 4 wherein the at least one first locking mechanism includes an adjustable telescoping mechanism.

6. The device of claim 1 wherein the pivotable support includes a first handle projecting away from the left side thereof proximate the front side thereof, and a second handle projecting away from the right side thereof proximate the front side thereof.

7. The device of claim 1 wherein the stationary base includes a stabilizing anti-rebound bar projecting downwardly from proximate the front side of the stationary base, the stabilizing anti-rebound bar adjustable in height and configured to engage a floor of the automobile to stabilize the stationary base.

8. The device of claim 7 wherein the stabilizing anti-rebound bar includes a height adjustment mechanism having at least a pair of telescoping members that are selectively mutually lockable.

9. The device of claim 7 wherein the stabilizing anti-rebound bar is selectively attachable to the stationary base with a stabilizing anti-rebound bar attachment mechanism.

10. The device of claim 1 wherein the top side of the pivotable support includes locking bars configured for fixing with the child's car seat.

11. The device of claim 1 wherein the top side of the pivotable support is substantially flat and includes a plurality of anchor points configured for anchoring the child's car seat thereto when engaged therewith.

12. The device of claim 1 where the flat top side of the stationary base includes an arched and inverted T-shaped groove, and wherein the bottom side of the pivotable support includes a projecting T-shaped tab configured for engagement with the inverted T-shaped groove, such that as the pivotable support pivots about either the first latch assembly or the second latch assembly, the T-shaped tab slides along the inverted T-shaped groove and retains the pivotable support onto the stationary base.

13. The device of claim 12 wherein the flat side of the stationary base includes a double-arched inverted T-shaped groove, a right-most arched groove terminating at the right side of the stationary base configured to accept the projecting T-shaped tab when the pivotable support pivots about the second latch assembly, and a left-most arched groove terminating at the left side of the stationary base configured to accept the projecting T-shaped tab when the pivotable support pivots about the first latch assembly.

* * * * *